United States Patent [19]

Ficken et al.

[11] 4,018,366

[45] Apr. 19, 1977

[54] NOZZLE HAVING A LATERAL CHUTE OUTLET

[75] Inventors: Leonard A. Ficken, Manchester; Gerald J. Podgorny, St. Louis, both of Mo.

[73] Assignee: UMC Industries, Inc., New York, N.Y.

[22] Filed: Sept. 9, 1975

[21] Appl. No.: 611,699

[52] U.S. Cl. ............................................. 222/412
[51] Int. Cl.² .......................................... G01F 11/24
[58] Field of Search .......... 222/412, 410, 413, 411, 222/553, 562, 536, 522–524, 569, 570, 402.11, 524, 410–413; 239/541, 538

[56] References Cited

UNITED STATES PATENTS

| | | | |
|---|---|---|---|
| 835,573 | 11/1906 | Stewart et al. | 222/553 X |
| 1,215,018 | 2/1917 | Grossman | 239/538 |
| 3,019,945 | 2/1962 | Pattillo | 222/536 X |
| 3,232,492 | 2/1966 | Carrier, Jr. | 222/412 X |
| 3,266,677 | 8/1966 | Hamilton | 222/410 X |

*Primary Examiner*—Stanley H. Tollberg
*Assistant Examiner*—Norman L. Stack, Jr.
*Attorney, Agent, or Firm*—Koenig, Senniger, Powers and Leavitt

[57] ABSTRACT

Apparatus comprising a nozzle for dispensing a fluent solid product, e.g., a dry ingredient such as instant coffee, instant tea, sugar, coffee lightener, chocolate or soup mix, in a hot beverage vendor, having a chute for delivering the product into a mixing bowl of the vendor where the product is mixed with hot water flowing through the bowl. The nozzle comprises a tubular body closed at one end constituting its outer end and having a lateral outlet, the tubular body being adapted to receive an auger of the dispenser for feeding the product through the body and thence out of the outlet. The chute is on a sleeve having a telescoping sliding fit on the tubular body. The sleeve has a lateral opening which registers with the outlet of the tubular body when the sleeve is in place on the body for flow of the product to the chute.

15 Claims, 13 Drawing Figures

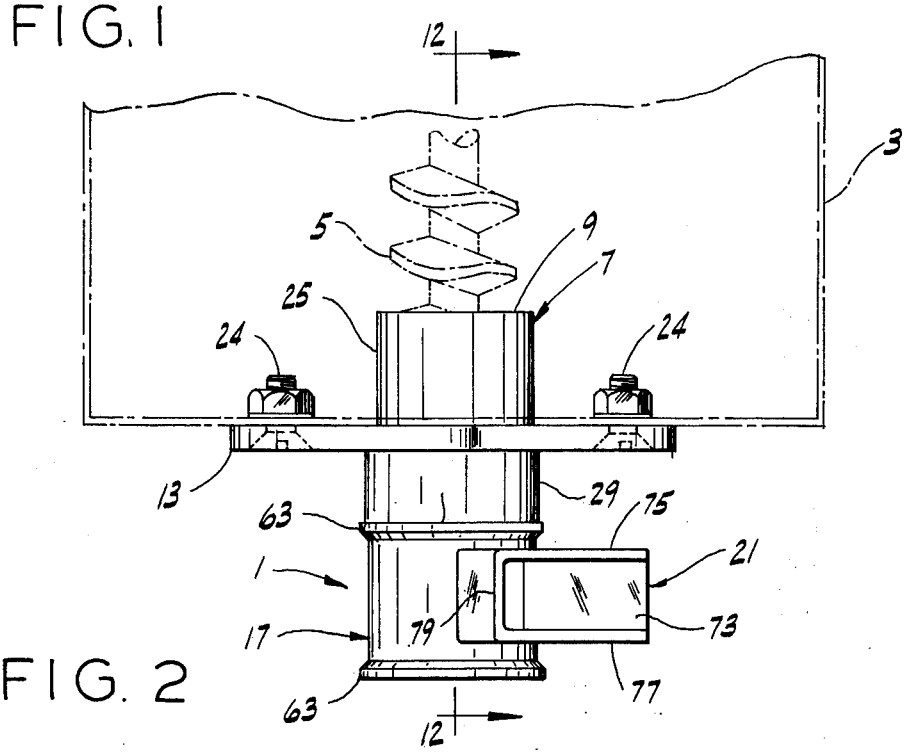
FIG. 1
FIG. 2
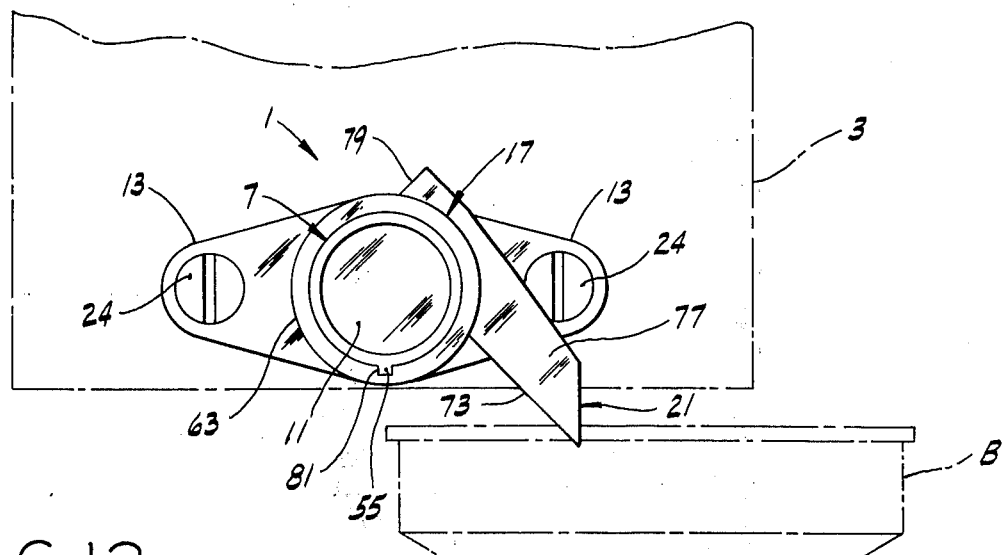
FIG. 12
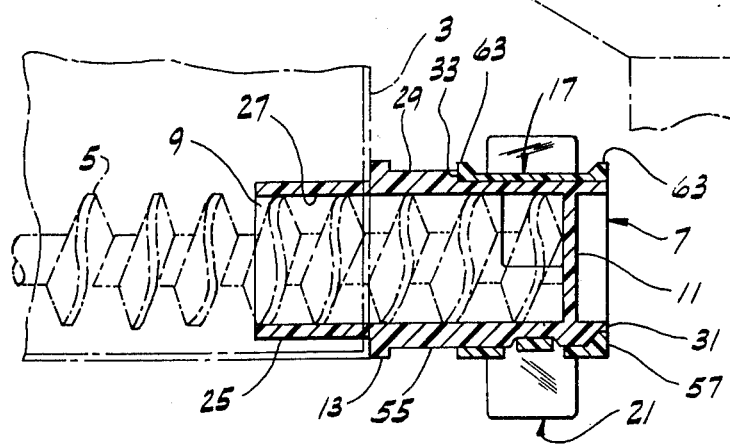

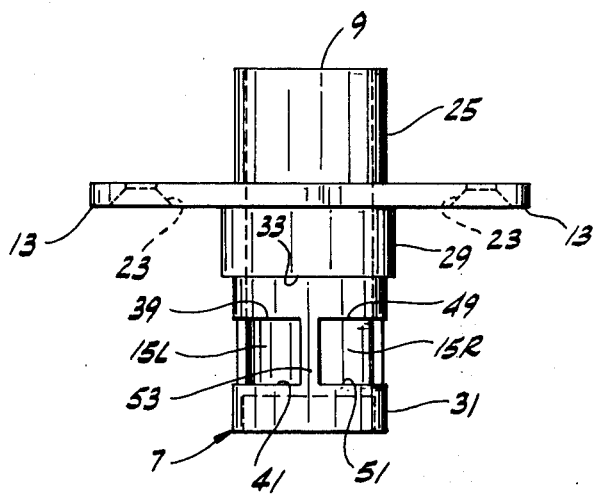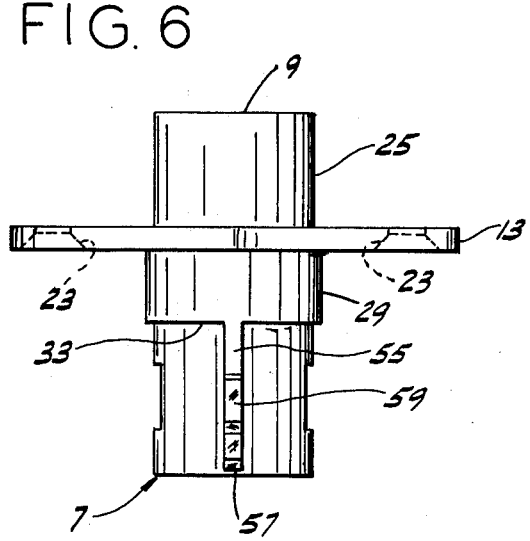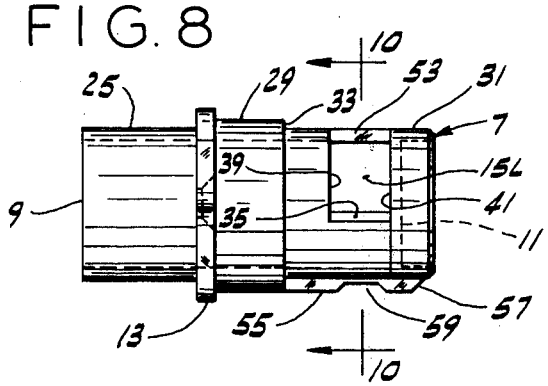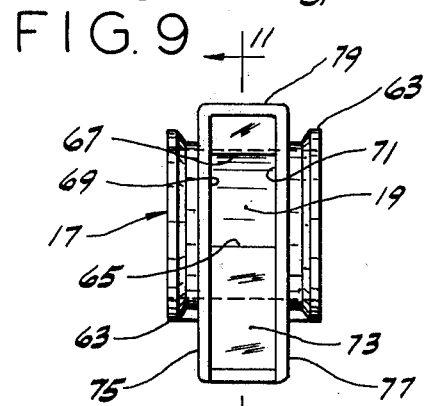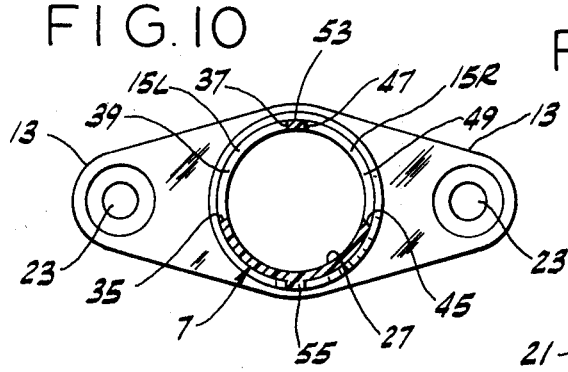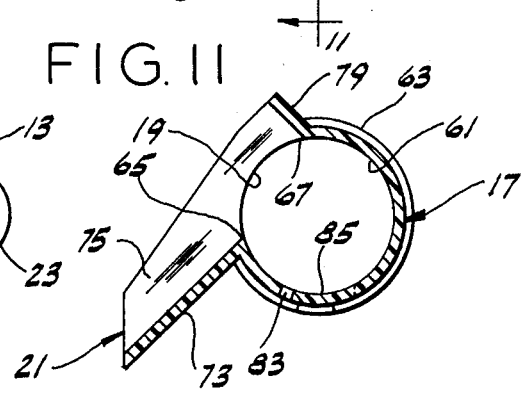

NOZZLE HAVING A LATERAL CHUTE OUTLET

BACKGROUND OF THE INVENTION

This invention relates to apparatus for dispensing fluent solid products, such as powdery, granulated and like products, and more particularly to a nozzle for use in a hot beverage vendor for dispensing a dry ingredient, such as instant coffee, instant tea, sugar, coffee lightener, chocolate or soup mix, from a supply of the ingredient into a mixing bowl of the vendor for mixing the ingredient with hot water flowing through the bowl to constitute a hot drink for delivery to a cup at the cup station of the vendor.

Prior dry ingredient nozzles for hot beverage vendors have generally involved a simple tube extending out from a receptacle or canister containing a supply of the ingredient to be dispensed, the tube being open at its outer end. The tube receives an auger for feeding the ingredient from the receptacle through the tube, the ingredient dropping out of the outer open end of the tube and falling into a mixing bowl of the vendor. With the ingredient falling freely from the outer open end of the nozzle into the bowl, there is a considerable tendency, particularly in the situation where the ingredient is powdery, for the ingredient to disperse and cause dusting of the adjacent parts. A shield is often provided around the nozzle to induce a downward draft of air to prevent steam from rising from the bowl around the nozzle and "caramelizing" the product, causing stoppage. The shield protects the nozzle from cross-drafts and thus reduces dusting, except that dust accumulates on the interior of the shield. The shield blocks access to the nozzle, and must be removed for cleaning the nozzle, as well as for cleaning the interior of the shield. This requires considerable time and effort on the part of the serviceman. Not only that, but the serviceman must remove the shield to determine whether it and the nozzle need cleaning.

SUMMARY OF THE INVENTION

Among the several objects of this invention may be noted the provision of an improved apparatus for dispensing a fluent solid product comprising a nozzle having a chute for controlled flow (as distinguished from free fall) of the product from the nozzle to reduce dusting, eliminating any necessity for use of a shield around the nozzle; the provision of such a nozzle which may be completely open for inspection to determine whether it needs cleaning and for access for cleaning it, without causing undue dusting; the provision of such a nozzle which may be easily and quickly cleaned, without loss of product by sifting from the nozzle during the cleaning operation; and the provision of such a nozzle as to which the chute may be positioned for flow of the dispensed product in either of two directions.

In general, a nozzle of this invention comprises a tubular body open at one end constituting its inner end, and closed at the other end constituting its outer end. The body has means for attaching it on the wall of a receptacle with its open inner end in communication with the interior of the receptacle to receive an auger extending into the body from the receptacle via the open end of the body. The body has a lateral outlet adjacent its outer end. A sleeve has a telescoping sliding fit on the tubular body and is slidable onto and off of the body from the outer end of the body. The sleeve has a lateral opening adapted to register with the outlet of the body when the sleeve is in place on the body and the sleeve further has a chute extending downwardly from said opening, whereby material fed by the auger through the body is adapted to exit from the body via the outlet, and pass via the opening in the sleeve to the chute and then down the chute. The sleeve, in being slid off the body, shears off any accumulation of product in the chute blocking said opening.

Other objects and features will be in part apparent and in part pointed out hereinafter.

BRIEF DESCRIPTION OF THE DRAWINGS

FIG. 1 is a plan of a nozzle of this invention, showing in phantom a receptacle to which the nozzle is applied and an auger for feeding a product from the receptacle through and out of the nozzle;

FIG. 2 is a front elevation of the nozzle, showing a chute of the nozzle positioned to slope down toward the right to a mixing bowl indicated in phantom;

FIG. 4 is a plan of a tubular body part per se of the nozzle;

FIG. 5 is a plan of a sleeve and chute part per se of the nozzle;

FIG. 6 is a bottom plan of FIG. 4;

FIG. 7 is a bottom plan of FIG. 5;

FIG. 8 is a side elevation of FIG. 4;

FIG. 9 is a right side elevation of FIG. 5;

FIG. 10 is a vertical transverse section on line 10—10 of FIG. 8;

FIG. 11 is a vertical transverse section on line 11—11 of FIG. 9; and

FIG. 12 is a vertical longitudinal section on line 12—12 of FIG. 1.

Corresponding reference characters indicate corresponding parts throughout the several views of the drawings.

DESCRIPTION OF THE PREFERRED EMBODIMENT

Figure 2A:
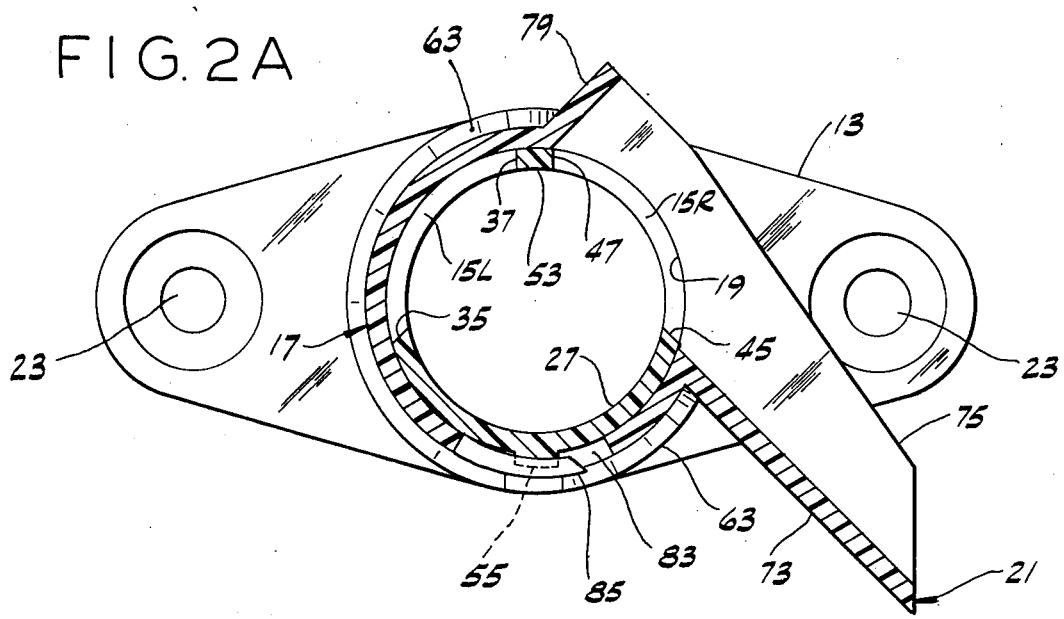
FIG. 2A is an enlarged fragment of FIG. 2 with parts broken away and shown in section.

Referring to the drawings, there is generally indicated at 1 a nozzle of this invention shown in FIGS. 1 and 2 as applied to a receptacle or canister 3 for dispensing a fluent solid product such as a powdery, granulated or like product from the receptacle by means of an auger 5 extending into the nozzle from the receptacle. The nozzle 1 has been developed for use on a receptacle or canister 3 such as used in a hot beverage vendor to hold a supply of a dry ingredient to be mixed with hot water in a mixing bowl B of the vendor. The ingredient may be instant coffee, instant tea, chocolate, or a soup mix, for example, for mixing with hot water flowing through the bowl to form coffee, tea, chocolate or soup, or it may be sugar for addition to coffee or tea, or coffee lightener for addition to coffee. However, it is possible that the nozzle may have uses outside the hot beverage vendor field.

The nozzle 1 comprises an elongate tubular body 7 open at one end constituting its inner end, as indicated at 9, and closed at its other end constituting its outer end, as indicated at 11. It has means constituted by a flange 13 adjacent its open end for attaching it to the receptacle or canister 3 with its open inner end 9 in communication with the interior of the receptacle to receive the auger 5 extending into the body 7 via the open end 9 of the body. The body 7 extends generally horizontally outward from the receptacle 3 and has a left-hand lateral outlet 15L and a right-hand lateral outlet 15R adjacent its closed outer end. Left and right are as viewed from the front (the outer end) of the body 7. The nozzle further comprises a sleeve 17 having a lateral opening 19 adapted to register with one or the other of said outlets 15L, 15R when the sleeve is in place on the body 7. The sleeve further has a chute 21 extending downwardly from the opening 19, whereby material fed by the auger 5 through the body 7 is adapted to exit from the body 7 via the outlet 15L or 15R which is in register with the opening 19 in the sleeve and pass via this opening to the chute and then down the chute.

More particularly, the tubular body 7 is preferably molded of a suitable plastic with the flange 13 projecting laterally outwardly on opposite sides of the body spaced from its inner end and having holes 23 for receiving fasteners 24 for securing it to a wall of the canister 3 with the cylindrical inner end section 25 of the body which extends inward from the flange 13 extending through an opening provided therefor in the wall of the canister. The nozzle is secured to the wall of the canister closely adjacent the bottom of the canister (see FIG. 12). As is conventional and well-known in conjunction with these canisters for hot beverage vendors, the auger 5 extends generally horizontally over the bottom of the canister to auger the dry ingredient into and out of the nozzle, the auger being driven by an electric motor (not shown) for a predetermined interval to feed out a metered amount of the ingredient. The tubular body 7 has a cylindrical bore 27 extending from its open inner end to the closure 11 at its outer end which, as appears in FIG. 12, may be of relatively thin-walled construction spaced back a short distance from the outer end of the tubular body 7. The diameter of the bore 27 corresponds to the diameter of the auger. The auger is rotatable in the tubular body 7 free of the body and free of the outer closed end 11 of the body.

Immediately outward of the flange 13, the tubular body 7 has a cylindrical section 29 of somewhat increased thickness and then a cylindrical outer end section 31 generally of the same thickness as the inner end section 25, an outwardly facing annular shoulder 33 being provided by the outer end of section 29 at the inner end of section 31. The outlets 15L and 15R are provided in section 31 immediately inward of the end closure 11 and centered longitudinally of section 31. The outlet 15L is in the left side of section 31, having a beveled lower edge 35 slightly below the horizontal axial plane of the body 7, an upper edge 37 slightly to the left of the vertical axial plane of the body 7, and inner and outer side edges 39 and 41. The outlet 15R is in the right side of section 31, similarly having a beveled lower edge 45 at the level of edge 35, an upper edge 47 slightly to the right of the vertical axial plane of the body, and inner and outer side edges 49 and 51. The two outlets are separated at the top by a narrow bridge 53 of the plastic of the body extending longitudinally of the body. The bottom of section 31 of the body is formed on the outside with a longitudinally extending key 55 having a beveled outer end as indicated at 57 and a notch 59 which is centered in respect to the central plane of the outlets 15L and 15R.

The sleeve 17 is also preferably molded of a suitable plastic of a length corresponding to the length of section 31 of the body 7 with a bore 61 adapted for a telescopic sliding fit on section 31. It has outwardly extending rims 63 at its ends to facilitate grasping it for sliding it off section 31. The opening 19 in the sleeve is of the same size and shape as outlet 15L and outlet 15R and is centered longitudinally of the sleeve (corresponding to the centering of outlets 15L and 15R longitudinally of section 31 of body 7). The lower edge of opening 19 is designated 65, its upper edge 67 and its side edges 69 and 71. The chute 21 has an inclined bottom wall 73 extending down from the lower edge 65 of opening 19, inner and outer side walls 75 and 77 at opposite sides of the bottom wall 73 and the sides 69 and 71 of opening 19, and a top wall 79 at the upper edge 67 of the opening 19. The sleeve has a keyway 81 at the bottom for receiving the key 55 on the bottom of body 7. This keyway extends longitudinally of the bore in the sleeve and is so located relative to the lateral opening 19 in the sleeve as to provide for registration of the opening 19 with the left-hand outlet 15L when the sleeve is telescoped on section 31 with the key in the keyway and with opening 19 on the left, and for registration of opening 19 with the right-hand outlet 15R when the sleeve is telescoped on section 31 with the key in the keyway and with opening 19 on the right. Engagement of the key in the keyway also orients the chute 21 to slope downwardly toward the left in the first case and toward the right in the second case. The bottom of the sleeve is formed with a central rectangular opening 83 extending across the keyway and a spring latch finger 85 extending centrally of opening 83 in the central transverse plane of the sleeve and following the curvature of the sleeve from one edge of opening 83. This spring finger is adapted to be cammed outwardly by the bevel 57 at the outer end of the key to ride on the key as the sleeve is telescoped on section 31 of the body and to snap into the notch 59 when the sleeve reaches its operative position on section 31 as determined by engagement of the inner end of the sleeve with the shoulder 33 at the inner end of section 31. This releasably latches the sleeve on section 31 of the body.

Figure 3:
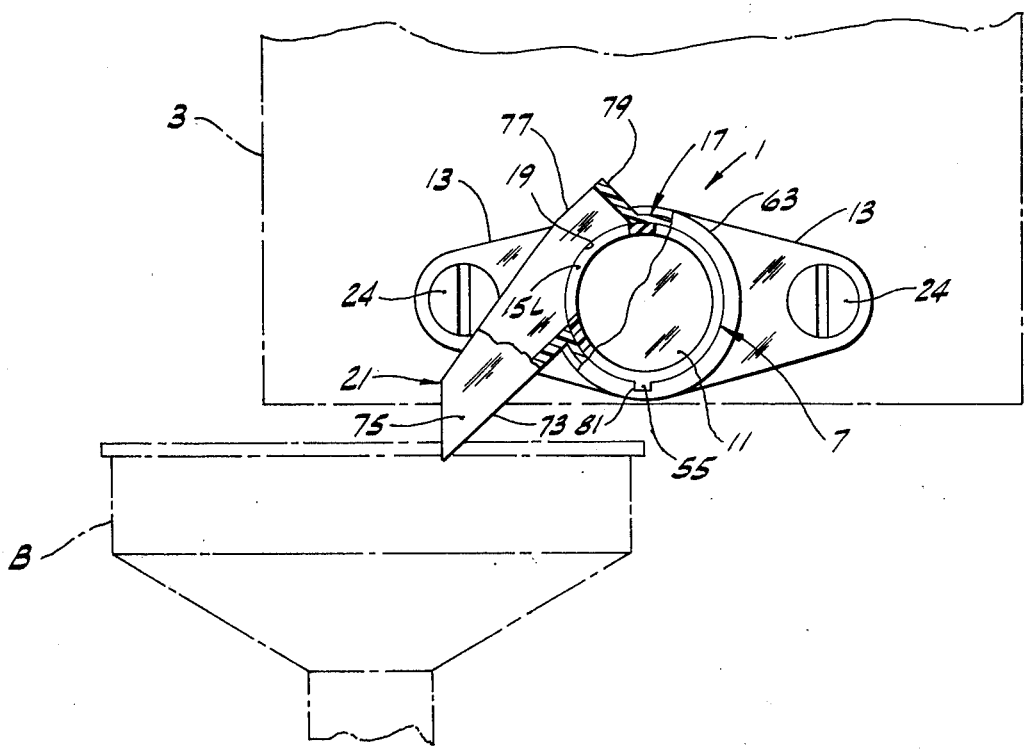
FIG. 3 is a view similar to FIG. 2 but showing the chute positioned to slope down toward the left to the mixing bowl, and with parts broken away and shown in section.

The sleeve 17 is adapted to be applied to section 31 in either of two positions, in one of which the chute extends down to the right as illustrated in FIG. 2 and in the other of which the chute extends down to the left as shown in FIG. 3. In the first of these positions, the opening 19 in the sleeve is in register with the right-hand outlet 15R of the tubular body 7, and in the second, the opening 19 is in register with the left-hand outlet 15L. In either of these positions, the spring latch finger 85 is sprung into the notch 59 releasably to latch the sleeve on the section 31 of the body. Upon operation of the auger 5, it feeds the dry fluent material from the receptacle 3 through the tubular body 7 to the outlet 15L or 15R, depending upon which of its two positions the sleeve 17 is in and the material exits from the tubular body via that outlet and slides down the chute 21 to the mixing bowl B. Thus, the flow of the material from the nozzle is controlled, as distinguished from free fall, to reduce dusting, particularly by having the lower end of the chute in close proximity to the bowl to minimize free fall. This eliminates any necessity for having a shield around the nozzle and leaves the nozzle open for inspection to determine whether it needs cleaning, and open for cleaning when it needs cleaning. For cleaning, the sleeve 17 is slid off the section 31 of the tubular body, and this shears off any accumulation of product in the chute blocking the opening 15L and 15R, as the case may be. With these openings or outlets 15L, 15R disposed laterally as shown, rather than bottomwise, there is no substantial loss of product from the tubular body 7 when the sleeve is pulled off for cleaning.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In apparatus for dispensing a fluent solid product comprising a receptacle for holding a supply of said product: a nozzle comprising a tubular body open at one end constituting its inner end and closed at the other end constituting its outer end, means for attaching said body on the wall of the receptacle closely adjacent the bottom of the receptacle with the open inner end of said body in communication with the interior of the receptable and with said body extending generally horizontally outward from the receptacle, said apparatus having an auger extending generally horizontally over the bottom of the receptacle into the body via the open inner end of the body, said auger being rotatable in said body free of the body and free of the outer closed end of the body, said body having a lateral outlet at one side thereof adjacent its outer end, a sleeve having a telescoping sliding fit on the tubular body and slidable onto and off of the body from the closed outer end of the body, said sleeve having a lateral opening adapted to register with said lateral outlet of said body when the sleeve is in place on the body and said sleeve further having a chute extending laterally outwardly and downwardly from said opening, whereby material fed by the auger through said body is adapted to exit sidewise from the body via said outlet, and pass via said opening in the sleeve to the chute and then down the chute, and whereby the sleeve, in being slid off the body, shears off any accumulation of product in the chute blocking said opening.

2. In dispensing apparatus as set forth in claim 1, the chute having a bottom wall extending from a lower edge of the opening in the sleeve, side walls at opposite sides of the bottom wall and said opening and a top wall at the upper edge of said opening.

3. In dispensing apparatus as set forth in claim 1, the tubular body and sleeve having interengageable means for registering the opening in the sleeve with the outlet and orienting the chute to slope downwardly away from said one side of the nozzle.

4. In dispensing apparatus as set forth in claim 3, means for releasably latching the sleeve on said tubular body with the opening in the sleeve registered with the outlet.

5. In dispensing apparatus as set forth in claim 1, said body having a second lateral outlet on the other side thereof, the sleeve being reversibly positionable on the body for registration of the opening in the sleeve with said second outlet and the chute then sloping downwardly away from said other side of the body.

6. In dispensing apparatus as set forth in claim 5, the chute having a bottom wall extending from a lower edge of the opening in the sleeve, side walls at opposite sides of the bottom wall and said opening and a top wall at the upper edge of said opening.

7. In dispensing apparatus as set forth in claim 6, the tubular body and sleeve having interengageable means for registering the opening in the sleeve with one or the other of said outlets and orienting the chute to slope downwardly away from one side or the other of the nozzle.

8. In dispensing apparatus as set forth in claim 7, means for releasably latching the sleeve on said tubular body with the opening in the sleeve registered with one or the other of the outlets.

9. In dispensing apparatus as set forth in claim 1, the means for attaching the tubular body to the receptacle comprising a flange on the body adjacent its open end, the body having an outwardly facing annular shoulder outward of the flange engageable by the inner end of the sleeve.

10. In dispensing apparatus as set forth in claim 9, the body and sleeve having interengageable key and keyway means.

11. In dispensing apparatus as set forth in claim 10, the key being on the bottom of the body and the keyway being in the bottom of the sleeve, the key having a notch therein, and the sleeve being formed with a spring finger for latching in the notch.

12. In dispensing apparatus as set forth in claim 10, the chute having a bottom wall extending from a lower edge of the opening in the sleeve, side walls at opposite sides of the bottom wall and said opening and a top wall at the upper edge of said opening.

13. In dispensing apparatus as set forth in claim 12, said body having a second lateral outlet on the other side thereof, the sleeve being reversibly positionable on the body for registration of the opening in the sleeve with said second outlet and the chute then sloping downwardly away from said other side of the body.

14. In dispensing apparatus as set forth in claim 13, the body and sleeve having interengageable key and keyway means for registering the opening in the sleeve with one or the other of said outlets and orienting the chute to slope downwardly away from one side or the other of the nozzle.

15. In dispensing apparatus as set forth in claim 14, the key being on the bottom of the body and the keyway being in the bottom of the sleeve, the key having a notch therein, and the sleeve being formed with a spring finger for latching in the notch.

* * * * *